United States Patent
Hsieh et al.

(10) Patent No.: US 12,015,190 B2
(45) Date of Patent: Jun. 18, 2024

(54) MULTIPLEXING STRUCTURE FOR WIRELESS ANTENNA AND TOUCH PAD OF TOUCH SENSOR, AND WIRELESS WEARABLE DEVICE

(71) Applicant: Tiinlab Corporation, Shenzhen (CN)

(72) Inventors: Kuan-Hong Hsieh, Guangdong (CN); Jian Huang, Guangdong (CN); Lingdong Xia, Guangdong (CN)

(73) Assignee: TIINLAB CORPORATION, Shenzhen (CN)

( * ) Notice: Subject to any disclaimer, the term of this patent is extended or adjusted under 35 U.S.C. 154(b) by 374 days.

(21) Appl. No.: 17/361,364

(22) Filed: Jun. 29, 2021

(65) Prior Publication Data
US 2021/0328324 A1    Oct. 21, 2021

Related U.S. Application Data

(63) Continuation of application No. PCT/CN2019/071065, filed on Jan. 10, 2019.

(51) Int. Cl.
| | |
|---|---|
| *H01Q 1/22* | (2006.01) |
| *G06F 3/0354* | (2013.01) |
| *G06F 3/041* | (2006.01) |
| *G06F 3/044* | (2006.01) |

(52) U.S. Cl.
CPC .......... *H01Q 1/22* (2013.01); *G06F 3/03547* (2013.01); *G06F 3/04164* (2019.05); *G06F 3/044* (2013.01)

(58) Field of Classification Search
CPC ...... H01Q 1/22; H01Q 1/243; G06F 3/03547; G06F 3/044
See application file for complete search history.

(56) References Cited

U.S. PATENT DOCUMENTS
| | | | | |
|---|---|---|---|---|
| 11,177,557 B2* | 11/2021 | Lee | ........................ | H01Q 21/08 |
| 2014/0361979 A1* | 12/2014 | Woo | ..................... | H04B 1/0475 |
| | | | | 343/702 |
| 2018/0183914 A9* | 6/2018 | Tsai | ..................... | H03K 17/74 |

FOREIGN PATENT DOCUMENTS
CN    107293841 A    10/2017

OTHER PUBLICATIONS
The Office Action of CN Application No. 201980087449.7 issued on Jun. 2, 2022.
The Search Report of CN Application No. 201980087449.7 issued on Jun. 2, 2022.

* cited by examiner

*Primary Examiner* — Hasan Islam
(74) *Attorney, Agent, or Firm* — Andrew C. Cheng

(57) ABSTRACT

Disclosed are a multiplexing structure for a wireless antenna and a touch pad of a touch sensor, and a wireless wearable device. The multiplexing structure includes a radiating touch pad, a first conductor, a first circuit, a second circuit, and a frequency dividing circuit. The radiating touch pad is configured to receive and transmit an RF signal and receive a touch signal. The first conductor is electrically connected to the radiating touch pad. The first circuit is electrically connected to the radiating touch pad through the first conductor. The frequency dividing circuit is electrically connected to the second circuit and the first conductor, and is located between the second circuit and the first conductor. The multiplexing structure can separate the touch signal and the RF signal, and can solve the problem of mutual signal interference in the wireless wearable device caused by space limitation.

8 Claims, 8 Drawing Sheets

MULTIPLEXING STRUCTURE FOR WIRELESS ANTENNA AND TOUCH PAD OF TOUCH SENSOR, AND WIRELESS WEARABLE DEVICE

FIELD

The application relates to the field of wireless wearable devices, in particular to a multiplexing structure for a wireless antenna and a touch pad of a touch sensor, and a wireless wearable device.

BACKGROUND

With the maturity of wireless wearable device technology, the interaction of wireless wearable devices by means of touch keys has become possible. A main control IC can be informed of a press action on a touch surface according to a capacitance change of the touch surface sensed by a touch sensor, thereby intelligently controlling operations of the wireless wearable device such as startup, shutdown, volume increase, volume decrease, playing a previous track, playing a next track, play, and pause. Because the touch sensitivity is in direct proportion to the touch area, certain requirements are put forward to the touch area of the touch sensor. In addition, a clearance zone needs to be reserved between a wireless Bluetooth antenna and a conductor to guarantee the stability of data transmission.

The wireless wearable device is generally required to have a low weight and small size. In a related technical solution, the touch pad of the touch sensor and the RF antenna are designed separately and independently, so independent spaces should be provided for the antenna and the touch pad. However, the touch pad may exert some influences on antenna signals when the antenna and the touch pad exist in a narrow space of the wireless wearable device, and the ground capacitance of the touch pad may change in the event of a touch action. The capacitance change is transmitted by a pogo-pin to and hence detected by a touch IC. An RF signal is received by a radiating component (RF Antenna) and is then transmitted by the pogo-pin to an RF IC. The touch pad and the RF antenna are completely independent of each other but are positioned close to each other due to the space limitation. However, the clearance zone required by the RF antenna for receiving signals may be decreased by metal components nearby and, therefore, signal reception of the RF antenna can be easily restrained by the touch pad, and the signal receiving and transmitting capacity of the antenna may thus be compromised.

SUMMARY

Embodiments of the application provide a multiplexing structure for a wireless antenna and a touch pad of a touch sensor, and a wireless wearable device, which allow the wireless antenna and the touch pad of the touch sensor to be disposed in a limited space without mutual influence between the wireless antenna and the touch pad of the touch sensor.

In one aspect, a multiplexing structure for a wireless antenna and a touch pad of a touch sensor includes a radiating touch pad configured to receive and transmit an RF signal and receive a touch signal; a first conductor electrically connected to the radiating touch pad; a first circuit electrically connected to the radiating touch pad through the first conductor and configured to control the radiating touch pad to receive and transmit the RF signal; a second circuit configured to process the touch signal received by the radiating touch pad; and a frequency dividing circuit connected and configured to allow the touch signal to enter the second circuit while preventing the RF signal from entering the second circuit.

In some embodiments, the frequency dividing circuit is electrically connected to the second circuit and the first conductor, located between the second circuit and the first conductor, and configured to isolate the RF signal.

In some embodiments, the multiplexing structure further includes a second conductor electrically connected to the radiating touch pad, an end of the second conductor away from the radiating touch pad being grounded.

In some embodiments, the multiplexing structure further includes a ground board, wherein the end of the second conductor away from the radiating touch pad is grounded through the ground board.

In some embodiments, the ground board is a circuit board.

In some embodiments, the frequency dividing circuit comprises an RF choke coil.

In some embodiments, the multiplexing structure further includes a second conductor electrically connected to the radiating touch pad. The second circuit is electrically connected to the radiating touch pad through the second conductor and configured to process the touch signal received by the radiating touch pad. The frequency dividing circuit is electrically connected to the radiating touch pad through the second conductor, an end of the frequency dividing circuit away from the second conductor being grounded, and the frequency dividing circuit configured to filter out the RF signal.

In some embodiments, the multiplexing structure further includes a ground board, wherein the end of the frequency dividing circuit away from the second conductor is grounded through the ground board, the ground board being a circuit board.

In some embodiments, the frequency dividing circuit includes a bypass capacitor.

In another aspect, a multiplexing structure for a wireless antenna and a touch pad of a touch sensor includes a radiating touch pad configured to receive and transmit an RF signal and receive a touch signal; a first conductor electrically connected to the radiating touch pad; a second conductor electrically connected to the radiating touch pad; a third conductor electrically connected to the radiating touch pad, an end of the third conductor away from the radiating touch pad being grounded, and the third conductor configured to provide a ground feed path for the wireless antenna; a first circuit electrically connected to the radiating touch pad through the first conductor and configured to control the radiating touch pad to receive and transmit the RF and a second circuit electrically connected to the radiating touch pad through the second conductor and configured to process the touch signal received by the radiating touch pad.

In some embodiments, the multiplexing structure further includes a ground board. The end of the third conductor away from the radiating touch pad is grounded through the ground board.

In some embodiments, the ground board is a circuit board.

In still another aspect, a wireless wearable device includes a multiplexing structure for a wireless antenna and a touch pad of a touch sensor. The multiplexing structure includes a radiating touch pad configured to receive and transmit an RF signal and receive a touch signal; a first conductor electrically connected to the radiating touch pad; a first circuit electrically connected to the radiating touch pad through the first conductor and configured to control the radiating touch pad to receive and transmit the RF signal; a second circuit configured to process the touch signal received by the radiating touch pad; and a frequency dividing circuit connected and configured to allow the touch signal to enter the second circuit while preventing the RF signal from entering the second circuit.

In some embodiments, the radiating touch pad is a shell of the wireless wearable device or a portion of the shell.

In some embodiments, the radiating touch pad is disposed on a surface of a shell of the wireless wearable device.

In some embodiments, the frequency dividing circuit is electrically connected to the second circuit and the first conductor, located between the second circuit and the first conductor, and configured to isolate the RF signal.

In some embodiments, the multiplexing structure further includes a second conductor electrically connected to the radiating touch pad, an end of the second conductor away from the radiating touch pad being grounded.

In some embodiments, the frequency dividing circuit comprises an RF choke coil.

In some embodiments, the multiplexing structure includes a second conductor electrically connected to the radiating touch pad. The second circuit is electrically connected to the radiating touch pad through the second conductor and configured to process the touch signal received by the radiating touch pad. The frequency dividing circuit is electrically connected to the radiating touch pad through the second conductor, an end of the frequency dividing circuit away from the second conductor being grounded, and the frequency dividing circuit is configured to filter out the RF signal.

In some embodiments, the frequency dividing circuit includes a bypass capacitor.

Other aspects of the disclosure will become apparent by consideration of the detailed description and accompanying drawings.

BRIEF DESCRIPTION OF THE DRAWINGS

To more clearly explain the technical solutions of the embodiments of the application or related art, drawings used for describing the embodiments of the application or the related art will be briefly introduced below. Obviously, the drawings in the following description only illustrate some embodiments of the application, and those ordinarily skilled in the art can obtain other drawings according to the following ones without creative labor.

Figure 1:
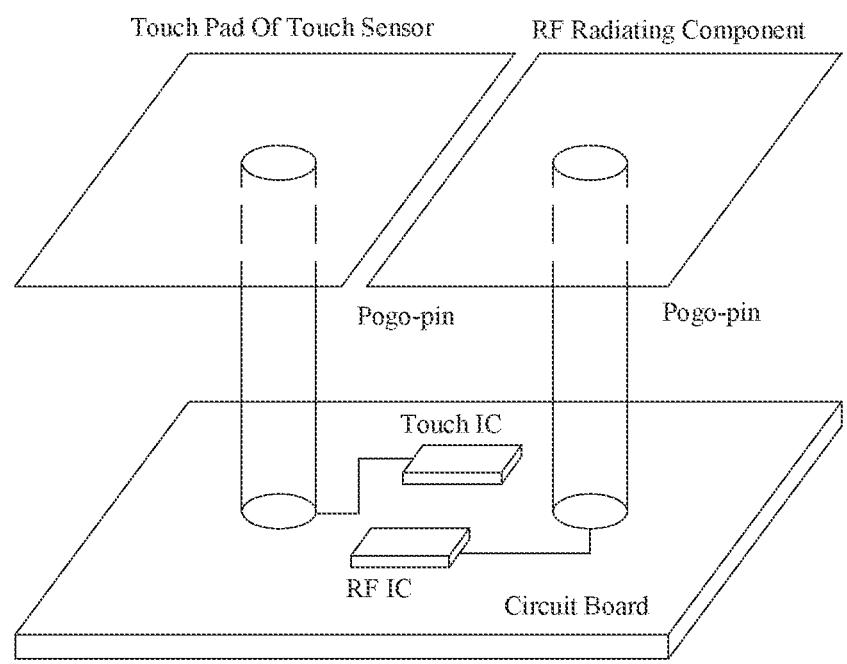
FIG. 1 illustrates a wireless antenna and a touch pad of a touch sensor in related art.

REFERENCE NUMERALS 10, wireless wearable device; 100, multiplexing structure for a wireless antenna and a touch pad of a touch sensor; 110, radiating touch pad; 120, first conductor; 130, first circuit; 140, second circuit; 150, frequency dividing circuit; 151, RF choke coil; 152, bypass capacitor; 160, second conductor; 170, ground board; 180, third conductor.

DESCRIPTION OF THE EMBODIMENTS

To gain a better understanding of the application, the application will be more comprehensively described below with reference to relevant drawings. While the drawings illustrate some preferred embodiments of the application, the application can be implemented in different forms, and shall not be limited to the embodiments described in the specification. In fact, these embodiments are provided for the purpose of a more thorough and comprehensive understanding of the contents disclosed in the application.

Referring to FIG. 1, in the related art, a touch pad of a touch sensor and a wireless antenna are designed separately and independently. A touch system includes the touch pad of the touch sensor, and the touch pad of the touch sensor is electrically connected to a touch IC through a pogo-pin. The ground capacitance of the touch pad may change in the event of a touch action. The capacitance change is transmitted by the pogo-pin to and hence detected by the touch IC. A wireless antenna system includes an RF radiating component (RF Antenna) which is electrically connected to the RF IC through another pogo-pin. RF signal is received by the RF radiating component and is then transmitted by the other pogo-pin to the RF IC. The wireless antenna may be a wireless Bluetooth antenna.

Because of the narrow space in a wireless wearable device, the touch pad of the touch sensor and the RF radiating component are positioned close to each other when both located in the wireless wearable device. In addition, the clearance zone required by the RF antenna for receiving signals may be decreased by metal components nearby. Therefore, signal reception of the RF antenna may be restrained by the touch pad, and the signal receiving and transmitting capacity of the antenna may thus be compromised. As a result, the touch pad of the touch senor in FIG. 1 may exert some influences on signals of the wireless antenna.

Figure 2:
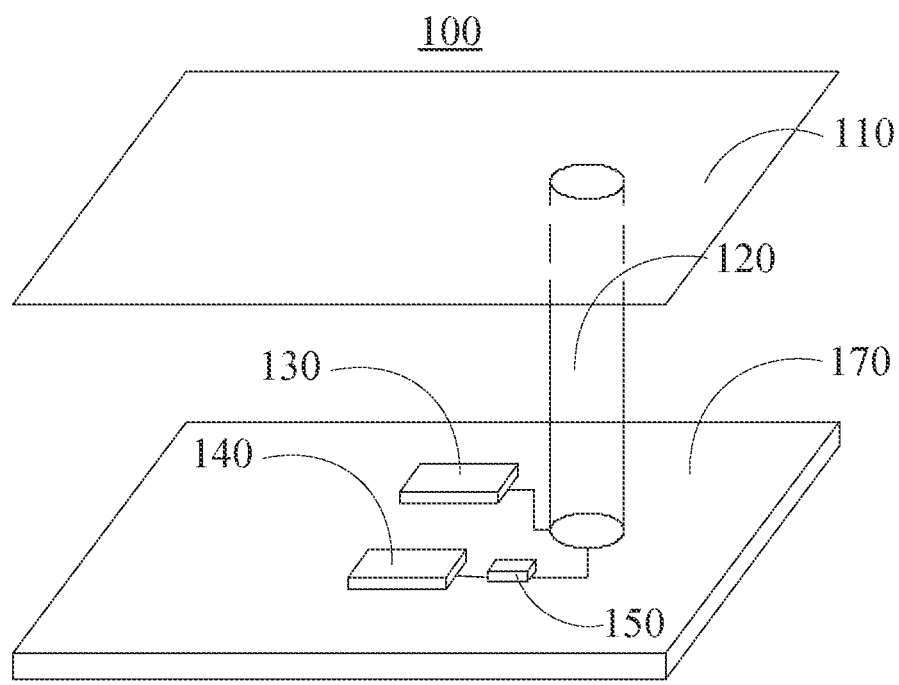
FIG. 2 is a schematic diagram of a multiplexing structure for a wireless antenna and a touch pad of a touch sensor according to some embodiments of the application.
Figure 3:
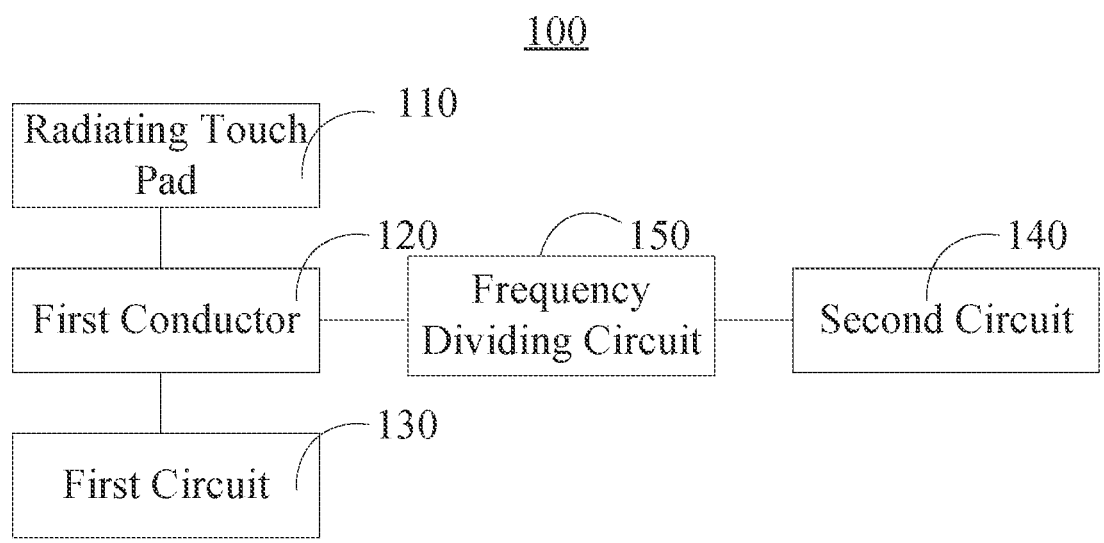
FIG. 3 is a schematic diagram of an electrical connection relation for multiplexing of a wireless antenna and a touch pad of a touch sensor of FIG. 2.

Referring to FIG. 2-FIG. 3, the application provides a multiplexing structure 100 for a wireless antenna and a touch pad of a touch sensor. The multiplexing structure 100 includes a radiating touch pad 110, a first conductor 120, a first circuit 130, a second circuit 140 and a frequency dividing circuit 150. The radiating touch pad 110 is configured to receive and transmit an RF signal and receive a touch signal. The first conductor 120 is electrically connected to the radiating touch pad 110. The first circuit 130 is electrically connected to the radiating touch pad 110 through the first conductor 120 and is configured to control the radiating touch pad 110 to receive and transmit the RF signal. The second circuit 140 is configured to process the touch signal received by the radiating touch pad 110. The frequency dividing circuit 150 is electrically connected to and located between the second circuit 140 and the first conductor 120, and is configured to isolate the RF signal.

The touch pad of the touch sensor and the radiating component of the wireless antenna are separate components in the related art. However, the touch pad of the touch sensor and the radiating component of the wireless antenna are combined in the radiating touch pad 110, that is, the touch pad of the touch sensor and the wireless antenna share one component. In the event of a touch action, the ground capacitance of the radiating touch pad 110 will vary. The variation of the capacitance is transmitted by the first conductor 120 to and hence detected by the second circuit 140. After receiving the RF signal, the radiating touch pad 110 transmits the RF signal to the first circuit 130 through the first conductor 120. Therefore, the radiating touch pad 110 can receive and transmit the touch signal and the RF signal by means of electrical signal connection, and can solve the problems of space limitation and mutual signal interference in the wireless wearable, device in conjunction with the frequency dividing circuit 150.

The first conductor 120 is electrically connected to the radiating touch pad 110 and is configured to provide a feed signal. The conductor 120 may be a pogo-pin, which can transmit electric energy and signals and has the characteristics of high stability, high durability, corrosion resistance, and the like, and can improve the usability and prolong the service life while guaranteeing normal operation of the multiplexing structure. The pogo-pin is configured as a precise connector in electronic products such as mobile phones, and is widely applied in semiconductor devices to realize a connection function. The pogo-pin has a small distributed capacitance and a small distributed inductance, thus being beneficial to impedance matching.

The first circuit 130 is configured to receive and transmit an RF signal of the wireless antenna. After being received by the radiating touch pad 110, the RF signal is transmitted to the first circuit 130 by the first conductor 120. The first circuit 130 may include a wireless main control IC. The touch signal received by the second circuit 140 may be sequentially transmitted by the first circuit 130 to the first conductor 120 and the radiating touch pad 110 and then emitted by the radiating touch pad 110, so that control over operations of the intelligently-controlled wireless wearable device, such as, startup, shutdown, volume increase, volume decrease, playing a previous track, playing a next track, play, and pause, can be realized. In addition, different intelligently-controlled wireless wearable devices can be controlled to perform different operations. The operations are not limited to startup, shutdown, volume increase, volume decrease, playing a previous track, playing a next track, play, and pause.

The second circuit 140 is configured to process the touch signal received by the radiating touch pad 110. The touch signal is transmitted to the second circuit 140 by the first conductor 120. The second circuit 140 may include a touch control IC. The second circuit 140 may process the touch signal through a Bluetooth module and then transmit the processed touch signal to the first circuit 130. A control signal is sent out by the first circuit 130 to realize intelligent control over the wireless wearable device.

The frequency dividing circuit 150 is configured to isolate the RF signal and provide a signal channel for the touch sensor in the radiating touch pad 110. After the radiating touch pad 110 generates a touch signal in response to a touch action, the touch signal is transmitted through the frequency dividing circuit 150 to the second circuit 140 for processing. After the radiating touch pad 110 receives the RF signal, the frequency dividing circuit 150 isolates the RF signal, so the RF signal cannot pass through the frequency dividing circuit 150. The RF signal can only enter the first circuit 130 for processing. In one embodiment, the frequency dividing circuit 150 includes an RF choke coil 151 which can be used to allow a low-frequency to pass while isolating RF.

In the multiplexing structure 100, the radiating component of the wireless antenna and the touch pad of the touch sensor are multiplexed by the radiating touch pad 110. The radiating touch pad 110 is electrically connected to the first circuit 130 and the second circuit 140 through the first conductor 120. The frequency dividing circuit 150 isolates the RF signal, so that the touch signal is separated from the RF signal, and mutual influence between the touch signal and the RF signal is avoided. Thus, the multiplexing structure 100 can solve the problem of mutual signal interference in the wireless wearable device caused by space limitation, and can realize multiplexing of the radiating component of the antenna and the touch pad of the touch sensor in a small space.

In one embodiment, the wireless antenna in the multiplexing structure 100 may be a monopole antenna system which includes the first circuit 130, the first conductor 120, and the radiating touch pad 110. A touch system includes the second circuit 140, the frequency dividing circuit 150, the first conductor 120, and the radiating touch pad 110. The radiating touch pad 110 and the first conductor 120 are shared by the monopole antenna system and the touch system. The radiating touch pad 110 can receive and transmit the RF signal, and can also sense the capacitance change in the event of a touch action so as to realize a touch function. This embodiment realizes multiplexing of the radiating component of the antenna and the touch pad of the touch sensor in a small space and separates the touch signal from the RF signal. When the monopole antenna and the touch pad share some components, in a normal operating state, the monopole antenna is used as the wireless antenna and is configured to receive and transmit data. Because wireless data transmission is carried out at 2.4G frequency band, continuous migration of charges in the same direction will not happen to the antenna, that is, the corresponding ground parasitic capacitance will not change and, therefore, misoperation of a touch panel part of the radiating touch pad 110 will not occur. When a user presses the radiating touch pad 110, the ground capacitance of the touch panel part of the radiating touch pad 110 will increase to trigger corresponding operation of the touch sensor.

Figure 4:
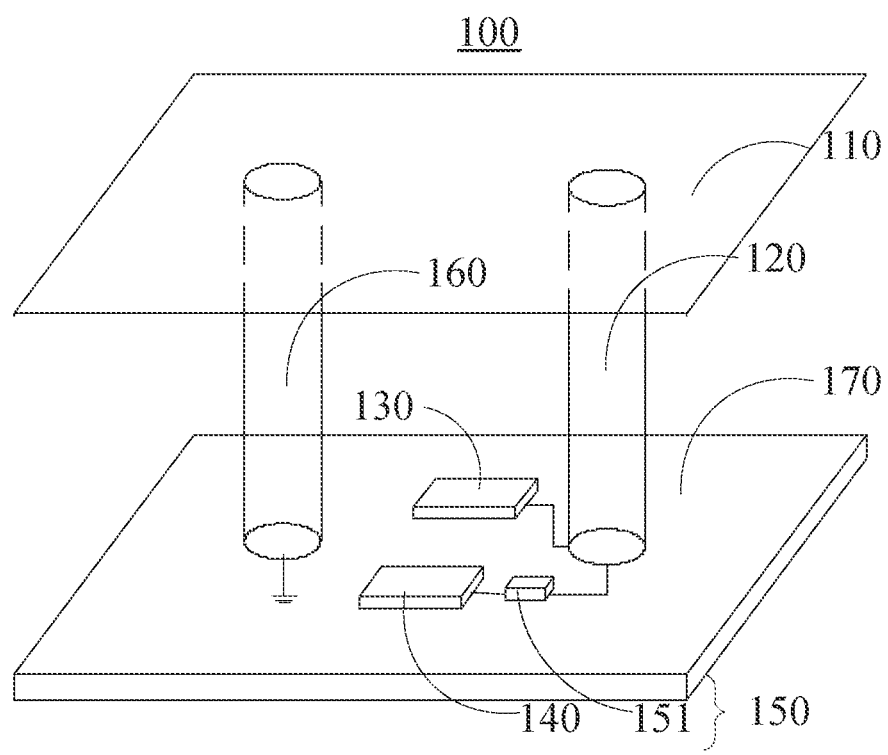
FIG. 4 is a schematic diagram of another multiplexing structure for a wireless antenna and a touch pad of a touch sensor according to some embodiments of the application.
Figure 5:
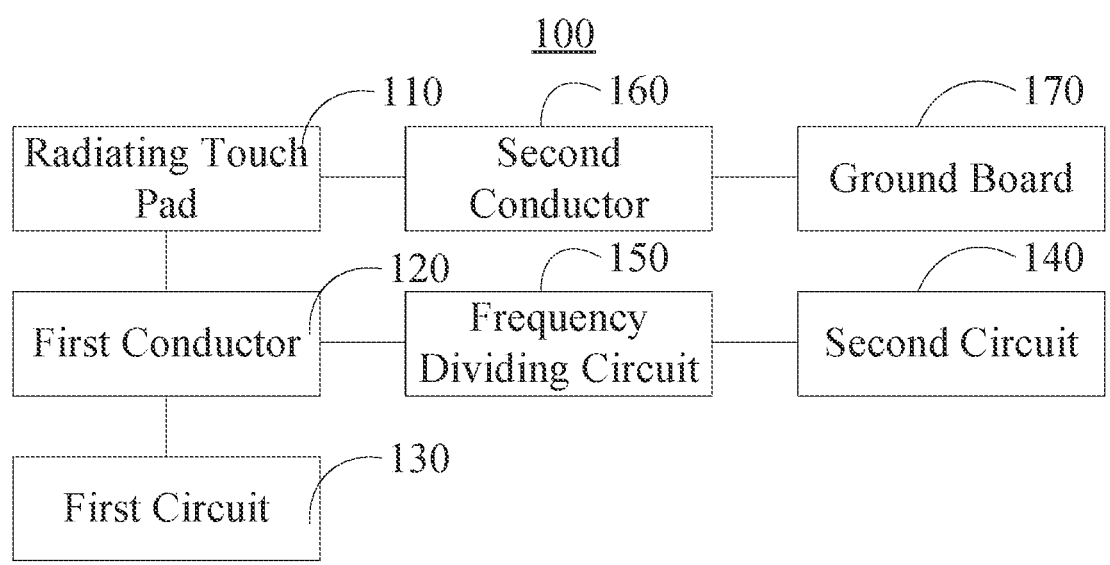
FIG. 5 is a schematic diagram of an electrical connection relation for multiplexing of a wireless antenna and a touch pad of a touch sensor of FIG. 4.

Referring to FIG. 4 and FIG. 5, in one embodiment, the multiplexing structure 100 further includes a second conductor 160. The second conductor 160 is electrically connected to the radiating touch pad 110, and an end of the second conductor 160 away from the radiating touch pad 110 is grounded. The second conductor 160 provides a ground feed path for the wireless antenna. In one embodiment, the second conductor 160 is a pogo-pin, which is a precise connector applied to electronic products such as mobile phones, and is widely applied in semiconductor devices to realize a connection function. The pogo-pin has a small distributed capacitance and a small distributed inductance, thus being beneficial to impedance matching.

In one embodiment, the wireless antenna in the multiplexing structure 100 may be a PIFA antenna. Compared with the monopole antenna, the PIFA antenna has an extra short-circuit matching function to make the impedance closer to the port input impedance, and is the most widely used internal antenna in electronic devices such as mobile phones. Advantages of the PIFA antenna include low weight, low profile, low cost, good mechanical strength, wide band, high efficiency, high gain, less influence by the environment, low radiation, wide frequency coverage, and the like. When the PIFA antenna and the touch pad of the touch sensor are multiplexed, the multiplexing structure 100 further includes the second conductor 160. The PIFA antenna system and the touch system share the first conductor 120 and the second conductor 160. The touch signal and the RF signal are both transmitted by the first conductor 120. The second conductor 160 provides a ground feed path for the PIFA antenna. The frequency dividing circuit 150 can isolate the RF signal, so that the touch signal is separated from the RF signal.

In one embodiment, the multiplexing structure 100 includes a ground board 170. The end of the second conductor 160 away from the radiating touch pad 110 is grounded through the ground board 170. In one embodiment, the ground board 170 is a circuit board. It should be understood that the circuit board may be a printed circuit board (PCB). The ground board 170 can provide a ground point for the second conductor 160. When the ground board 170 is a circuit board, the second conductor 160 is electrically connected to the grounding point on the circuit board. In addition, the first circuit 130 and the second circuit 140 may be both disposed on the circuit board, which is more consistent with actual product application in which the multiplexing structure 100 is used. By using the circuit board as the ground board 170, the size of the multiplexing structure 100 can be further reduced, and the practicability is improved. In another embodiment, the ground board 170 may be a shell of an electronic device (e.g. a wireless wearable device illustrated in FIG. 10) that employs the multiplexing structure 100.

Figure 6:
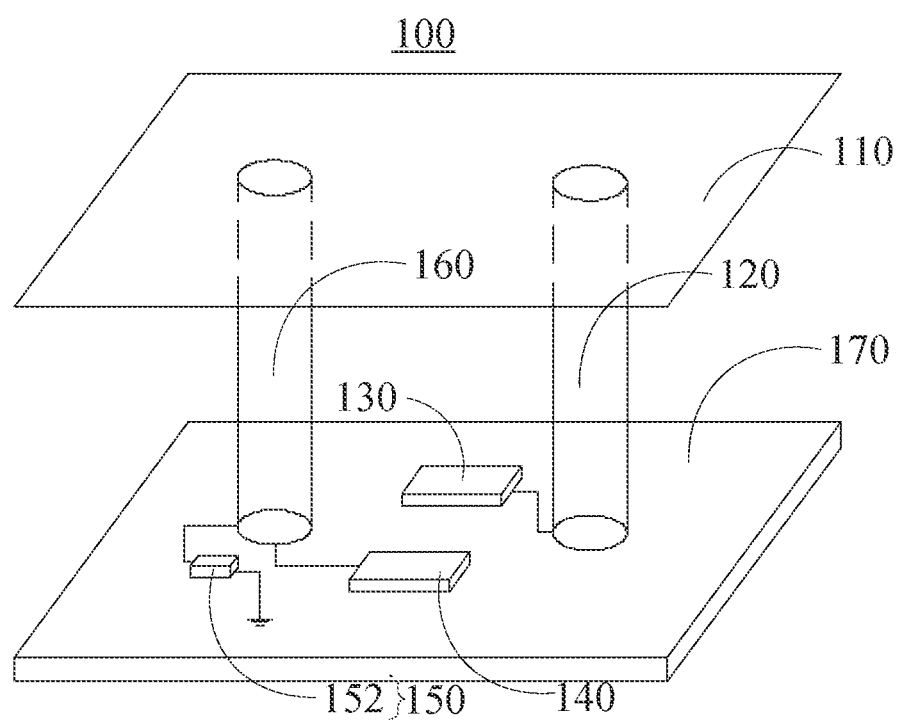
FIG. 6 is a schematic diagram of another multiplexing structure for a wireless antenna and a touch pad of a touch sensor according to some embodiments of the application.
Figure 7:
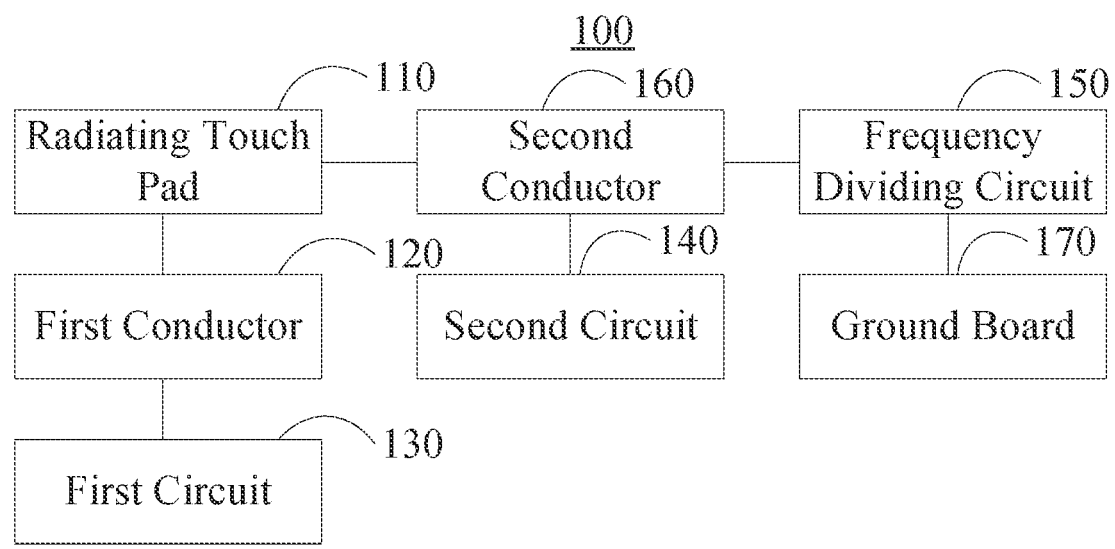
FIG. 7 is a schematic diagram of an electrical connection relation for multiplexing of a wireless antenna and a touch pad of a touch sensor of FIG. 6.

Referring to FIG. 6 and FIG. 7, the application provides a multiplexing structure 100 for a wireless antenna and a touch pad of a touch sensor. The multiplexing structure 100 includes a radiating touch pad 110, a first conductor 120, a second conductor 160, a first circuit 130, a second circuit 140, and a frequency dividing circuit 150. The radiating touch pad 110 is configured to receive and transmit an RF signal, and receive a touch signal. The first conductor 120 is electrically connected to the radiating touch pad 110. The second conductor 160 is electrically connected to the radiating touch pad 110. The first circuit 130 is electrically connected to the radiating touch pad 110 through the first conductor 120 and is configured to control the radiating touch pad 110 to receive and transmit the signal. The second circuit 140 is electrically connected to the radiating touch pad 110 through the second conductor 160 and is configured to process the touch signal received by the radiating touch pad 110. The frequency dividing circuit 150 is electrically connected to the radiating touch pad 110 through the second conductor 160, and an end of the frequency dividing circuit 150 away from the second conductor 160 is grounded. The frequency dividing circuit 150 is configured to filter out the RF signal.

Specifically, the radiating touch pad 110, the first conductor 120, the first circuit 130, and the second circuit 140 of the embodiment illustrated in FIG. 6 and FIG. 7 may be the same as the radiating touch pad 110, the first conductor 120, the first circuit 130, and the second circuit 140 provided in any of the previous embodiments of FIG. 2 to FIG. 5, further explanations of which are therefore not repeated herein.

The second conductor 160 is electrically connected to the radiating touch pad 110 and the second circuit 140. When the radiating touch pad 110 generates a touch signal after being touched, the touch signal is transmitted by the second conductor 160 to the second circuit 140 for processing. Because the first conductor 120 is configured to transmit the RF signal received by the radiating touch pad 110 and the second conductor 160 is configured to transmit the touch signal, the touch signal is separated from the RF signal. The multiplexing structure 100 including the frequency dividing circuit 150 solves the problem that the signal receiving and transmitting capacity of the antenna may be compromised because signal reception of the wireless antenna can be easily limited by the touch pad.

The frequency dividing circuit 150 includes a bypass capacitor 152. The bypass capacitor 152 can filter out high-frequency components from an alternating current having high-frequency current components and low-frequency current components. The bypass capacitor 152 can generate an alternating-current branch. The bypass capacitor 152 has small impedance to high-frequency signals, so that the high-frequency RF signal can enter the bypass capacitor 152 to eliminate unnecessary energy transmitted to the second circuit 140. The frequency dividing circuit 150 provides a ground feed path for the wireless antenna part in the radiating touch pad 110 and eliminates the influence, of the RF signal on the second circuit 140.

In the multiplexing structure 100, the radiating component of the antenna and the touch pad of the touch sensor are multiplexed by the radiating touch pad 110. The radiating touch pad 110 is electrically connected to the first circuit 130 through the first conductor 120, and is electrically connected to the second circuit 140 through the second conductor 160. The frequency dividing circuit 150 provides a ground feed path for the wireless antenna, so that the RF signal is filtered out. In this way, the touch signal is separated from the RF signal, and mutual influence between the touch signal and the RF signal is avoided. Thus, the multiplexing structure 100 can solve the problem of mutual signal interference in the wireless wearable device caused by space limitation, and can realize multiplexing of the radiating component of the antenna and the touch pad of the touch sensor in a small space.

In one embodiment, the wireless antenna in the multiplexing structure 100 may be a PIFA antenna. The PIFA antenna may be the same as the PIFA antenna provided in any of the above embodiments, further explanations of which are therefore not repeated herein. When multiplexed, the PIFA antenna and the touch pad of the touch sensor share the first conductor 120 and the second conductor 160. The RF signal is transmitted by the first conductor 120. The touch signal is transmitted by the second conductor 160. The frequency dividing circuit 150 can prevent the influence of the RF signal on the second circuit 140, so that the touch signal is separated from the RF signal.

In one embodiment, the wireless antenna in the multiplexing structure 100 further includes a ground board. The end of the frequency dividing circuit 150 away from the second conductor 160 is grounded through the ground board 170. In one embodiment, the ground board 170 is a circuit board. It should be understood that the circuit board may be a printed circuit board (PCB). The ground board 170 can provide a ground point for the frequency dividing circuit 150. When the ground board 170 is a circuit board, the frequency dividing circuit 150 is electrically connected to the ground point on the circuit board. Moreover, the first circuit 130 and the second circuit 140 may be both disposed on the circuit board, which is more consistent with the actual product application in which the multiplexing structure is used. By using the circuit board as the ground board 170, the size of the wireless antenna in the multiplexing structure 100 for a wireless antenna and a touch pad of a touch sensor 100 can be further reduced, and the practicability is improved.

Figure 8:
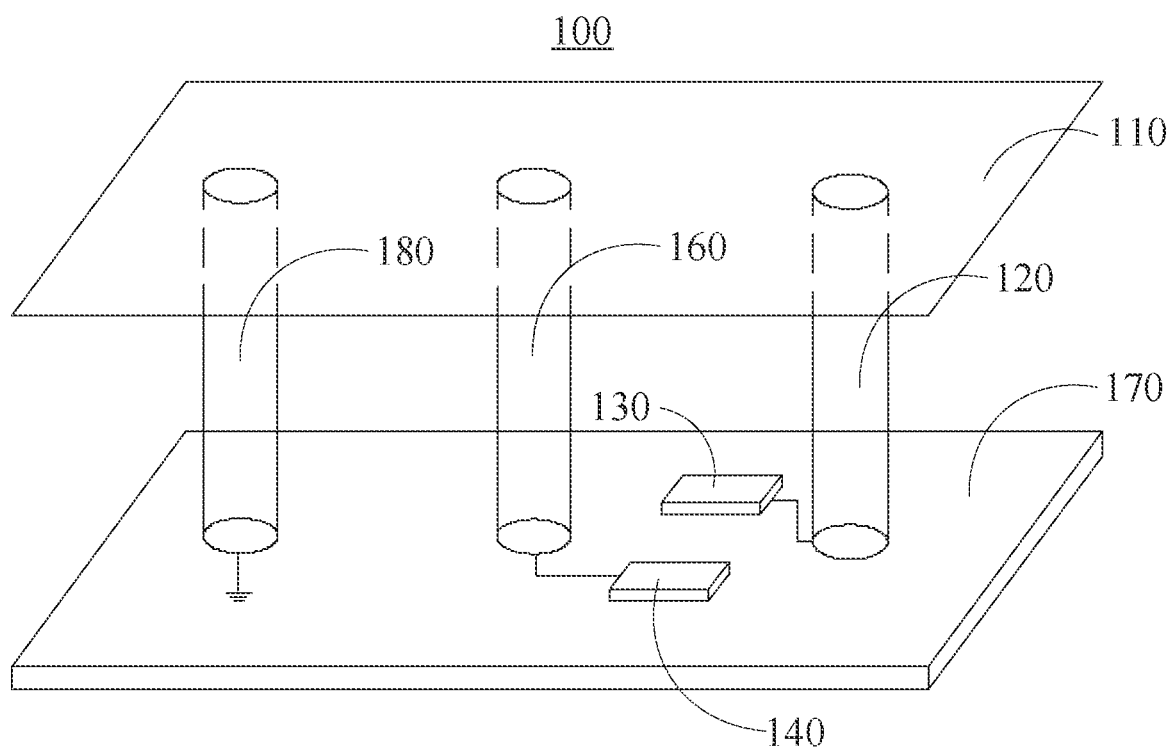
FIG. 8 is a schematic diagram of still another multiplexing structure for a wireless antenna and a touch pad of a touch sensor according to some embodiments of the application.
Figure 9:
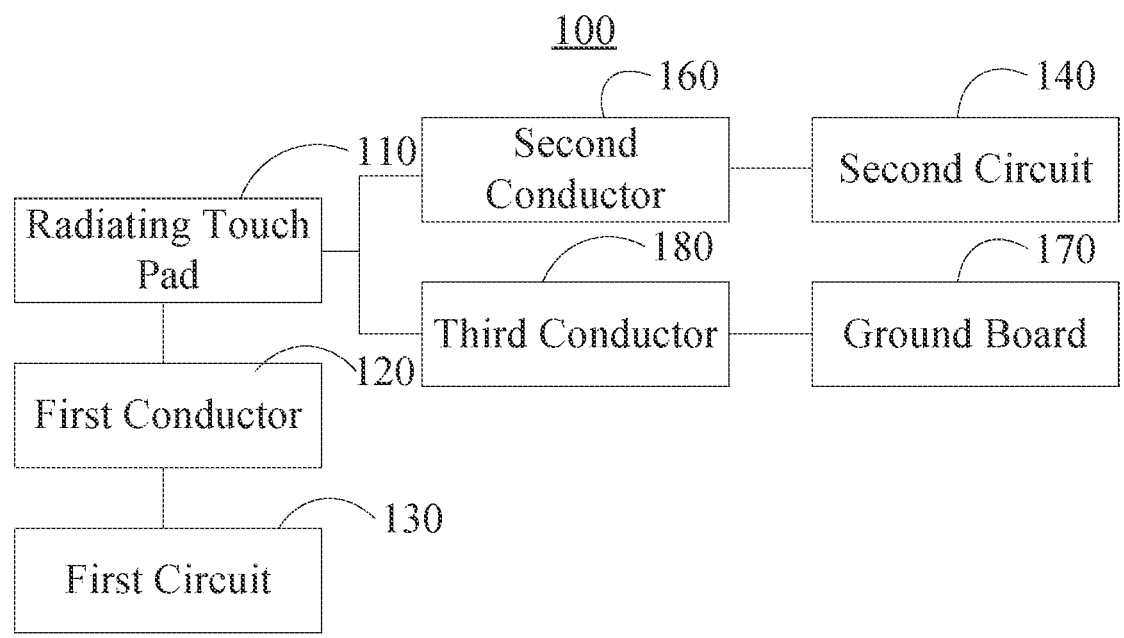
FIG. 9 is a schematic diagram of an electrical connection relation for multiplexing of a wireless antenna and a touch pad of a touch sensor of FIG. 8.

Referring to FIG. 8 and FIG. 9, in one embodiment, the application provides a multiplexing structure 100 for a wireless antenna and a touch pad of a touch sensor. The multiplexing structure 100 includes a radiating touch pad 110, a first conductor 120, a second conductor 160, a third conductor 180, a first circuit 130, and a second circuit 140. The radiating touch pad 110 is configured to receive and transmit an RF signal, and receive a touch signal. The first conductor 120 is electrically connected to the radiating touch pad 110. The second conductor 160 is electrically connected to the radiating touch pad 110. The third conductor 180 is electrically connected to the radiating touch pad 110, and an end of the third conductor 180 away from the radiating touch pad 110 is grounded. The third conductor 180 is configured to provide a ground feed path for the wireless antenna. The first circuit 130 is electrically connected to the radiating touch pad 110 through the first conductor 120, and is configured to control the radiating touch pad 110 to receive and transmit the RF signal. The second circuit 140 is electrically connected to the radiating touch pad 110 through the second conductor 160, and is configured to process the touch signal received by the radiating touch pad 110.

Specifically, the radiating touch pad 110, the first conductor 120, the first circuit 130 and the second circuit 140 of the embodiment of FIG. 8 and FIG. 9 may be the same as the radiating touch pad 110, the first conductor 120, the first circuit 130 and the second circuit 140 provided in any of the above embodiments illustrated in FIG. 2 to FIG. 5, further explanations of which are therefore not repeated herein.

The second conductor 160 is electrically connected to the radiating touch pad 110 and the second circuit 140. The third conductor 180 is electrically connected to the radiating touch pad 110. An end of the third conductor 180 away from the radiating touch pad 110 is grounded, and is configured to provide a ground feed path for the wireless antenna. It can be understood that the first conductor 120 provides a feed path for a wireless antenna system in the multiplexing structure 100, the second conductor 160 provides a feed path for the touch system, and the third conductor 180 provides a ground feed path for the wireless antenna system. The third conductor 180 can avoid mutual influence between the RF signal and the second circuit 140 while providing the ground feed path for the wireless antenna system, so that the RF signal is separated from the touch signal.

In the multiplexing structure 100, the radiating component of the antenna and the touch pad of the touch sensor are multiplexed by the radiating touch pad 110. The radiating touch pad 110 is electrically connected to the first circuit 130 through the first conductor 120. The second conductor 160 is electrically connected to the second circuit 140. The third conductor 180 provides a ground feed path for the wireless antenna. The third conductor 180 eliminates the mutual influence between the RF signal and the second circuit 140, so that the touch signal is separated from the RF signal, thereby avoiding mutual influence between the touch signal and the RF signal is avoided. Thus, the multiplexing structure 100 can solve the problem of mutual signal interference in the wireless wearable device caused by space limitation, and can realize multiplexing of the radiating component of the antenna and the touch pad of the touch sensor in a small space.

In one embodiment, the wireless antenna in the multiplexing structure 100 for a wireless antenna and a touch pad of a touch sensor may be a PIFA antenna. The PIFA antenna may be the same as the PIFA antenna provided in any of the above-mentioned embodiments, explanations of which are therefore not repeated. When the PIFA antenna and the touch pad of the touch sensor are multiplexed, the PIFA antenna system and the touch system share the first conductor 120, the second conductor 160 and the third conductor 180. The RF signal is transmitted by the first conductor 120. The touch signal is transmitted by the second conductor 160. The third conductor 180 is grounded. The third conductor 180 can isolate the RF signal from the second circuit 140, so that the touch signal is separated from the RF signal.

In one embodiment, the multiplexing structure 100 further includes a ground board 170. The end of the third conductor 180 away from the radiating touch pad 110 is grounded through the ground board 170. In one embodiment, the ground board 170 is a circuit board. It can be understood that the circuit board may be a printed circuit board (PCB). The ground board 170 can provide a ground point for the third conductor 180. When the ground board 170 is a circuit board, the third conductor 180 is electrically connected to the ground point in the circuit board. In addition, the first circuit 130 and the second circuit 140 may be both disposed on the circuit board, which is more consistent with the actual product application in which the multiplexing structure 100 is used. By using the circuit board as the ground board 170, the size of the multiplexing structure 100 for a wireless antenna and a touch pad of a touch sensor can be further reduced, and the practicability is improved.

Figure 10:
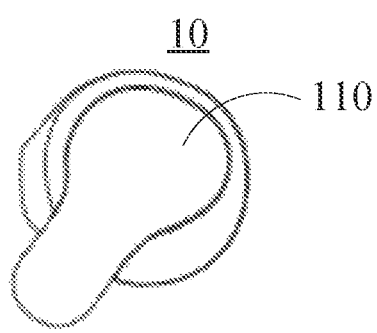
FIG. 10 is a schematic diagram of the installation position of a radiating touch pad of a wireless wearable device in some embodiments of the application.

Referring to FIG. 10, the application further provides a wireless wearable device 10, which employs the multiplexing structure for a wireless antenna and a touch pad of a touch sensor as described in various embodiments above.

In one embodiment, the wireless wearable device 10 includes the multiplexing structure 100 for a wireless antenna and a touch pad of a touch sensor as described in the embodiment of FIG. 2 and FIG. 3. That is, the multiplexing structure 100 includes a radiating touch pad 110, a first conductor 120, a first circuit 130, a second circuit 140, and a frequency dividing circuit 150. The radiating touch pad 110 is configured to receive and transmit an RF signal, and receive a touch signal. The first conductor 120 is electrically connected to the radiating touch pad 110. The first circuit 130 is electrically connected to the radiating touch pad 110 through the first conductor 120 and is configured to control the radiating touch pad 110 to receive and transmit the RF signal. The second circuit 140 is configured to process the touch signal received by the radiating touch pad 110. The frequency dividing circuit 150 is electrically connected to and between the second circuit 140 and the first conductor 120, and the frequency dividing circuit 150 is configured to isolate the RF signal.

In one embodiment, the wireless wearable device 10 includes the multiplexing structure 100 for a wireless antenna and a touch pad of a touch sensor as described in the embodiment of FIG. 4 and FIG. 5. Specifically, the radiating touch pad 110, the first conductor 120, the first circuit 130, the second circuit 140, and the frequency dividing circuit 150 of the wireless wearable device 10 may be the same as the radiating touch pad 110, the first conductor 120, the first circuit 130, the second circuit 140, and the frequency dividing circuit 150 provided in any of the above embodiments of FIG. 2 to FIG. 5, explanations of which are therefore not repeated herein.

In one embodiment, the wireless wearable device 10 includes the multiplexing structure 100 for a wireless antenna and a touch pad of a touch sensor as described in the embodiment of FIG. 6 and FIG. 7. That is, the multiplexing structure 100 includes a radiating touch pad 110, a first conductor 120, a second conductor 160, a first circuit 130, a second circuit 140, and a frequency dividing circuit 150. The radiating touch pad 110 is configured to receive and transmit an RF signal, and receive a touch signal. The first conductor 120 is electrically connected to the radiating touch pad 110. The second conductor 160 is electrically connected to the radiating touch pad 110. The first circuit 130 is electrically connected to the radiating touch pad 110 through the first conductor 120 and is configured to control the radiating touch pad 110 to receive and transmit the RF signal. The second circuit 140 is electrically connected to the radiating touch pad 110 through the second conductor 160 and is configured to process the touch signal received by the radiating touch pad 110. The frequency dividing circuit 150 is electrically connected to the radiating touch pad 110 through the second conductor 160. An end of the frequency dividing circuit 150 away from the second conductor 160 is grounded, and the frequency dividing circuit 150 is configured to filter out the RF signal.

The radiating touch pad 110, the first conductor 120, the second conductor 160, the first circuit 130, the second circuit 140, and the frequency dividing circuit 150 in the wireless wearable device 10 have been discussed in the embodiment of FIG. 6 and FIG. 7 in detail, further explanations of which are therefore not repeated herein.

In one embodiment, the wireless wearable device 10 includes the multiplexing structure 100 for a wireless antenna and a touch pad of a touch sensor as described in the embodiment of FIG. 8 and FIG. 9. That is, the multiplexing structure 100 includes a radiating touch pad 110, a first conductor 120, a second conductor 160, a third conductor 180, a first circuit 130, and a second circuit 140. The radiating touch pad 110 is configured to receive and transmit an RF signal, and receive a touch signal. The first conductor 120 is electrically connected to the radiating touch pad 110. The second conductor 160 is electrically connected to the radiating touch pad 110. The third conductor 180 is electrically connected to the radiating touch pad 110. An end of the third conductor 180 away from the radiating touch pad 110 is grounded, and the third conductor 180 is configured to provide a ground feed path for the wireless antenna. The first circuit 130 is electrically connected to the radiating touch pad 110 through the first conductor 120 and is configured to control the radiating touch pad 110 to receive and transmit the RF signal. The second circuit 140 is electrically connected to the radiating touch pad 110 through the second conductor 160 and is configured to process the touch signal received by the radiating touch pad 110.

The radiating touch pad 110, the first conductor 120, the second conductor 160, the third conductor 180, the first circuit 130 and the second circuit 140 have been discussed in the above embodiment of FIG. 8 and FIG. 9 in detail, further explanations of which are therefore not repeated herein.

Referring again to FIG. 10, in this embodiment, the radiating touch pad 110 is a shell of the wireless wearable device 10 or a portion of the shell. The wireless wearable device 10 may be an earphone, and a rear cover of the earphone may be partially or completely made of metal, so that both an antenna function and a touch function are realized. In one embodiment, the radiating touch pad 110 is disposed on the surface of the shell of the wireless wearable device 10. In addition, the radiating touch pad 110 can be formed as a metal shell of the wireless wearable device 10, a portion of the metal shell, or a decoration of the wireless wearable device 10. It can be understood that the metal shell is not limited to the rear cover. If the radiating touch pad 110 is used as a shell of the wireless wearable device 10, multiplexing of the wireless antenna, the touch pad of the touch sensor and the shell can be realized, such that the size of the wireless wearable device 10 is reduced, and the practicability is improved. In one embodiment, the frequency dividing circuit 150 includes a bypass capacitor 152. The bypass capacitor 152 may be any one of the bypass circuits 152 provided by the above embodiments, explanations of which are not repeated herein.

The technical features of the above embodiments can be combined freely. For the sake of clarity, not all possible combinations of the technical features of the above embodiments are described. All combinations of these technical features obtained without conflicts should be considered as falling within the scope of the specification.

It will be apparent to those skilled in the art that various modifications and variations can be made to the disclosed structure without departing from the scope or spirit of the application. In view of the foregoing, it is intended that the present application cover modifications and variations of this disclosure provided they fall within the scope of the following claims and their equivalents.

What is claimed is:

1. A multiplexing structure (100) comprising:
   a radiating touch pad (110) configured to receive and transmit an RF signal and receive a touch action and generate a touch signal in response to the touch action;
   a first conductor (120) electrically connected to the radiating touch pad (110);
   a first circuit (130) electrically connected to the radiating touch pad (110) through the first conductor (120) and configured to control the radiating touch pad (110) to receive and transmit the RF signal;
   a second circuit (140) configured to process the touch signal received by the radiating touch pad (110); and
   a frequency dividing circuit (150) configured to allow the touch signal to enter the second circuit (140) while preventing the RF signal from entering the second circuit (140);
   wherein the frequency dividing circuit (150) is electrically connected to the second circuit (140) and the first conductor (120) located between the second circuit (140) and the first conductor (120), and configured to isolate the signal.

2. The multiplexing structure (100) according to claim 1, further comprising:
   a second conductor (160) electrically connected to the radiating touch pad (110), an end of the second conductor (160) away from the radiating touch pad (110) being grounded.

3. The multiplexing structure (100) according to claim 2, further comprising a ground board (170), wherein the end of the second conductor (160) away from the radiating touch pad (110) is grounded through the ground board (170).

4. The multiplexing structure (100) according to claim 3, wherein the ground board (170) is a circuit board.

5. The multiplexing structure (100) according to claim 1, wherein the frequency dividing circuit (150) comprises an RF choke coil (151).

6. A multiplexing structure (100) comprising:
a radiating touch pad (110) configured to receive and transmit an RF signal and receive a touch action and generate a touch signal in response to the touch action;
a first conductor (120) electrically connected to the radiating touch pad (110);
a first circuit (130) electrically connected to the radiating touch Dad (110) through the first conductor (120) and configured to control the radiating touch pad (110) to receive and transmit the RF signal;
a second circuit (140) configured to process the touch signal received by the radiating touch pad (110);
a frequency dividing circuit (150) configured to allow the touch signal to enter the second circuit (140) while preventing the RF signal from entering the second circuit (140); and
a second conductor (160) electrically connected to the radiating touch pad (110);
wherein the second circuit (140) is electrically connected to the radiating touch pad (110) through the second conductor (160) and configured to process the touch signal received by the radiating touch pad (110);
the frequency dividing circuit (150) is electrically connected to the radiating touch pad (110) through the second conductor (160), an end of the frequency dividing circuit (150) away from the second conductor (160) is grounded, and the frequency dividing circuit (150) is configured to filter out the RF signal.

7. The multiplexing structure (100) according to claim 6, further comprising:
a ground board (170), wherein the end of the frequency dividing circuit (150) away, from the second conductor (160) is grounded through the ground board (170), the ground board (170) being a circuit board.

8. The multiplexing structure (100) according to claim 6, wherein frequency dividing circuit (150) includes a bypass capacitor (152).

* * * * *